United States Patent
Bode et al.

(10) Patent No.: US 9,365,807 B2
(45) Date of Patent: Jun. 14, 2016

(54) REMOVAL OF GREASY STAINS COMPRISING POROUS POLYAMIDE PARTICLES

(71) Applicant: Henkel AG & Co. KGaA, Duesseldorf (DE)

(72) Inventors: Nicole Bode, Duesseldorf (DE); Benoit Luneau, Ratingen (DE); Inga Kerstin Vockenroth, Duesseldorf (DE); Yvonne Willemsen, Korschenbroich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/729,197

(22) Filed: Jun. 3, 2015

(65) Prior Publication Data

US 2015/0267147 A1    Sep. 24, 2015

Related U.S. Application Data

(63) Continuation of application No. PCT/EP2013/075131, filed on Nov. 29, 2013.

(30) Foreign Application Priority Data

Dec. 5, 2012   (DE) .................. 10 2012 222 263

(51) Int. Cl.

| | |
|---|---|
| *C11D 1/83* | (2006.01) |
| *C11D 3/12* | (2006.01) |
| *C11D 3/14* | (2006.01) |
| *C11D 3/43* | (2006.01) |
| *C11D 3/386* | (2006.01) |
| *C11D 9/20* | (2006.01) |
| *C11D 3/37* | (2006.01) |
| *C11D 17/00* | (2006.01) |
| *C08G 69/26* | (2006.01) |
| *C11D 11/00* | (2006.01) |

(52) U.S. Cl.
CPC .............. *C11D 3/3719* (2013.01); *C08G 69/26* (2013.01); *C11D 11/0017* (2013.01); *C11D 17/0013* (2013.01); *Y10T 428/2982* (2015.01)

(58) Field of Classification Search
CPC ............ C11D 3/12; C11D 3/14; C11D 3/201; C11D 3/386; C11D 3/43; C11D 7/263; C11D 9/20; C11D 1/83
See application file for complete search history.

(56) References Cited

U.S. PATENT DOCUMENTS

| | | | | |
|---|---|---|---|---|
| 5,690,945 A | * | 11/1997 | Bui-Bertrand et al. | ....... 424/401 |
| 5,728,389 A | * | 3/1998 | Sebillotte-Arnaud | ........ 424/400 |
| 5,804,205 A | * | 9/1998 | Epstein et al. | ................ 424/401 |
| 5,824,296 A | * | 10/1998 | Dubief et al. | .............. 424/70.11 |
| 6,419,935 B1 | * | 7/2002 | Gueret | .......................... 424/401 |
| 6,821,525 B2 | * | 11/2004 | Howard et al. | ............... 424/401 |
| 2001/0028894 A1 | * | 10/2001 | Gueret | ......................... 424/443 |
| 2003/0139320 A1 | | 7/2003 | Catalan et al. | |
| 2006/0083762 A1 | * | 4/2006 | Brun et al. | ..................... 424/401 |
| 2011/0142788 A1 | * | 6/2011 | Sellier et al. | ............... 424/78.18 |
| 2012/0192887 A1 | * | 8/2012 | Vic et al. | ........................ 132/204 |
| 2013/0133679 A1 | * | 5/2013 | Kergosien et al. | ............ 132/200 |
| 2014/0031305 A1 | * | 1/2014 | Terrisse et al. | .................. 514/25 |

FOREIGN PATENT DOCUMENTS

| | | | |
|---|---|---|---|
| DE | 4328254 A1 | | 3/1995 |
| DE | 102008009462 | * | 8/2009 |
| DE | 102008009462 A1 | | 8/2009 |
| EP | 2338962 A1 | | 6/2011 |
| WO | 2007/128962 A1 | | 11/2007 |
| WO | 2011/051140 A1 | | 5/2011 |

OTHER PUBLICATIONS

PCT International Search Report (PCT/EP2013/075131) dated Jun. 3, 2014.

* cited by examiner

*Primary Examiner* — Charles Boyer
(74) *Attorney, Agent, or Firm* — Thomas G. Krivulka

(57) ABSTRACT

The application describes the use of porous polyamide particles which have a volume-weighted median particle size of 1 to 50 μm, an oil absorption capacity of at least 60 g/100 g, and a specific BET surface area (as specified in DIN 66131) of 1 to 20 m$^2$/g, for removing greasy stains from textile surfaces in a laundry detergent or cleaning agent which is used in a laundry or cleaning process.

5 Claims, No Drawings

REMOVAL OF GREASY STAINS COMPRISING POROUS POLYAMIDE PARTICLES

FIELD OF THE INVENTION

The present invention generally relates to the use of porous polymer particles in laundering or cleaning textiles.

BACKGROUND OF THE INVENTION

Laundry detergents and cleaning agents generally contain, in addition to the ingredients essential for the laundry or cleaning process, such as surfactants and builder materials, further components which can be summarized under the term laundry additives and which comprise various active ingredient groups such as foam control agents, graying inhibitors, bleaching agents, odorants and enzymes. Laundry additives also include discoloration inhibitors that prevent color transfer from colored textiles onto differently colored, particularly light-colored or white, textiles.

From DE 43 28 254 A1, water-soluble or water-dispersible polyamides are known which are used as discoloration inhibitors in laundry detergents or cleaning agents.

From WO 2007/128962 A1, it is further known that polyamides in the form of particles can be used in laundry detergents and cleaning agents as discoloration inhibitors.

By using polyamide particles in combination with hydrogen peroxide, light, particularly white, textiles can be protected against discolorations particularly effectively, as shown in WO 2011/051140 A1.

One of the most important tasks of a laundry detergent or cleaning agent is to remove greasy stains. Greasy stains can consist of greases, waxes or oils, but are often also mixtures thereof, and can be of animal, vegetable or synthetic origin. It is generally known that greasy stains represent so-called problematic stains which are difficult to remove from textiles.

The removal of greasy stains in a laundry or cleaning process is expressly desired by the user, wherein often a pretreatment of stained textiles is required, which is little user-friendly. Thus, the need exists to provide laundry detergents or cleaning agents having an increased grease removal power.

This task is achieved by the usage of porous polyamide particles having
  a volume-weighted median particle size of 1 to 50 μm,
  an oil absorption capacity of at least 60 g/100 g, and
  a specific BET surface (as specified in DIN 66131) of 1 to 20 $m^2/g$,
and serving to remove greasy stains from textile surfaces in a laundry detergent or cleaning agent which is used in a laundry or cleaning process.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of porous polyamide particles having
  a volume-weighted median particle size of 1 to 50 μm,
  an oil absorption capacity of at least 60 g/100 g, and
  a specific BET surface (as specified in DIN 66131) of 1 to 20 $m^2/g$,
for removal of greasy stains from textile surfaces in a laundry detergent or cleaning agent which is used in a laundry or cleaning process.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Surprisingly it has been found that the usage of the specific porous polyamide particles in laundry detergents or cleaning agents leads to unexpectedly good results in the removal of greasy stains.

Preferably, the specific porous polyamide particles contain polyamide-6, polyamide-12, copolyamide-6/12 or mixtures thereof.

It is further preferable that the specific porous polyamide particles have a volume-weighted median particle size of 2 to 40 μm, preferably of 3 to 30 μm and particularly preferably of 5 to 20 μm, since particles of this size exhibit particularly effective removal of greasy stains.

In a further preferred embodiment of the invention, the specific porous polyamide particles have an oil absorption capacity of 80 g/100 g to 250 g/100 g, preferably of 100 g/100 g to 200 g/100 g and particularly preferably of 100 g/100 g to 160 g/100 g.

It is also preferred if the specific porous polyamide particles have a specific BET surface (as specified in DIN 66131) of 1 to 15 $m^2/g$, preferably of 1 to 10 $m^2/g$, and particularly preferably of 2 to 10 $m^2/g$.

A large specific surface of the specific porous polyamide particles enables multiple interactions between the particles and the textiles or the greasy stains respectively, whereby the specific porous polyamide particles are particularly well suited for the removal of greasy stains.

In a further preferred embodiment of the invention, the specific porous polyamide particles are used in a liquid laundry detergent or cleaning agent.

On using the specific porous polyamide particles according to the invention, the particles are used in amounts of 0.5 to 10 wt %, preferably of 1 to 10 wt %, more preferably of 1 to 7 wt %, even more preferably of 1 to 5 wt %, and particularly preferably of 2 to 5 wt % in relation to the total laundry detergent or cleaning agent.

A further advantage of the invention is that the specific porous polyamide particles can be used for the removal of greasy stains and as dye transfer inhibitor at the same time.

Below the invention will be explained in more detail, among others, by means of examples.

The specific porous polyamide particles are used according to the invention in a laundry detergent or cleaning agent which can be solid or liquid and which may in particular be present as a homogenous solution or suspension and which may basically contain all known ingredients common in such an agent besides the specific porous polyamide particles used according to the invention. The laundry detergent or cleaning agent may in particular contain inorganic and/or organic builder substances, surfactants, bleaching agents on the base of organic and/or inorganic peroxygen compounds, bleach activators, water-miscible organic solvents, enzymes, sequestrating agents, electrolytes, pH regulators, stabilizers and further excipients, such as optical brighteners, graying inhibitors, foam control agents and dyes and fragrances. It is also possible to introduce the specific particulate polymer or an agent containing this specific particulate polymer packaged in portions into a water-soluble material, e.g. a poylvinylalcohol film, into the laundry or cleaning process.

The specific porous polyamide particles can be used in a laundry detergent or cleaning agent in amounts of 0.5 to 10 wt %, preferably of 1 to 10 wt %, more preferably of 1 to 7 wt %, even more preferably of 1 to 5 wt %, and particularly preferably in amounts of 2 to 5 wt %, in relation to the total laundry detergent or cleaning agent.

In a preferred embodiment of the invention, the specific porous polyamide particles contain polyamide-6 (polymer of epsilon-caprolactam), polyamide-12 (polymer of epsilon-laurolactam), copolyamide-6/12 (copolymer of epsilon-caprolactam and epsilon-laurolactam) or mixtures thereof, with the porous polyamide particles in a further preferred embodiment of the invention consisting of polyamide-6, polyamide-12, copolyamide-6/12 or mixtures thereof.

The use of specific porous polyamide particles containing or consisting of copolyamide-6/12 represent particularly preferred embodiments of the invention.

It is further preferred that the specific porous polyamide particles have a volume-weighted median particle size of 2 to 40 µm, preferably of 3 to 30 µm, and particularly preferably of 5 to 20 µm, since particles of this size exhibit particularly effective removal of greasy stains. The particle size distribution can be determined using the method according to DIN ISO 13319.

In a further preferred embodiment of the invention, the specific porous polyamide particles have an oil absorption capacity of 80 g/100 g to 250 g/100 g, preferably of 100 g/100 g to 200 g/100 g, and particularly preferably of 100 g/100 g to 160 g/100 g. The oil absorption capacity describes the capability of a solid to absorb oils, greases and/or waxes. This is not an attachment to the surface of the solid, although additionally also an attachment to the surface of the solid can take place, but an absorption of oils, greases and/or waxes into the free volume of the absorbing phase, in this case the specific porous polyamide particles. The oil absorption capacity can be determined by the method according to DIN EN ISO 787-5.

It is further preferred if the specific porous polyamide particles have a specific BET surface (as specified in DIN 66131) of 1 to 15 $m^2$/g, preferably of 1 to 10 $m^2$/g, and particularly preferably of 2 to 10 $m^2$/g.

The laundry detergent or cleaning agent may contain a surfactant or several surfactants, wherein particularly anionic surfactants, non-ionic surfactants and the mixtures thereof, but also cationic, zwitterionic and amphoteric surfactants may be considered.

Suitable non-ionic surfactants are in particular alkyl glycosides and ethoxylation and/or propoxylation products of alkyl glycosides or linear or branched alcohols each having 12 to 18 C atoms in the alkyl part and 3 to 20, preferably 4 to 10, alkyether groups. Further, respective ethoxylation and/or propoxylation products of N-alkylamines, vicinal diols, fatty acid esters and fatty acid amines, corresponding to the mentioned long-chain alcohol derivatives with respect to the alkyl part, and of alkylphenoles having 5 to 12 C atoms in the alkyl group are useful.

As non-ionic surfactants, preferably alkoxylated, advantageously ethoxylated, in particular primary alcohols preferably having 8 to 18 C atoms and 1 to 12 mole ethylene oxide (EO) per mole alcohol on average, are being used, in which the alcohol group may be linear or preferably methyl-branched in position 2 or may contain linear or methyl-branched groups in the mixture, as normally being present in oxoalcohol groups. However, particularly preferred are alcohol ethoxylates having linear groups from alcohols of native origin having 12 to 18 C atoms, e.g. from coco, palm, tallow fatty or oleyl alcohol, and 2 to 8 EO per mole alcohol on average. Preferred ethoxylated alcohols include e.g. $C_{12-14}$-alcohols having 3 EO, 4 EO or 7 EO, $C_{9-11}$-alcohols having 7 EO, $C_{13-15}$-alcohols having 3 EO, 5 EO, 7 EO or 8 EO, $C_{12-18}$-alcohols having 3 EO, 5 EO or 7 EO and mixtures thereof, such as mixtures of $C_{12-14}$-alcohol having 3 EO and $C_{12-18}$-alcohol having 7 EO. The ethoxylation levels given represent statistic average values which, for a specific product, may be an integer or a fractional number. Preferred alcohol ethoxylates have a restricted homolog distribution (narrow range ethoxylates, NRE). In addition to these non-ionic surfactants, also fatty alcohols having more than 12 EO may be used. Examples for these are tallow fatty alcohols having 14 EO, 25 EO, 30 EO or 40 EO. Also non-ionic surfactants may be used, which contain EO and PO groups (PO: propylene oxide) together in the molecule. Further, also a mixture of a (multiple) branched ethoxylated fatty alcohol and an unbranched ethoxylated fatty alcohol is suitable, such as a mixture of a $C_{16-18}$-fatty alcohol having 7 EO and 2-propyl-heptanol having 7 EO. Particularly preferably, the laundry detergent or cleaning agent contains a $C_{16-18}$-fatty alcohol having 7 EO or a $C_{13-15}$-oxoalcohol having 7 EO as non-ionic surfactant.

The anionic surfactants such as sulfonates, sulfates, alkyl phosphates, anionic silicone surfactants and soaps can be present in the form of their sodium, potassium or ammonium salts and as soluble salts of organic bases such as mono-, di- or triethanolamine. Preferably, the anionic surfactants are present in the form of their sodium or potassium salts, particularly in the form of the sodium salts.

As surfactants of the sulfonate type, preferably linear $C_{9-13}$-alkylbenzenesulfonates (LAS) and olefinsulfonates may be considered. Suitable are also $C_{12-18}$-alkanesulfonates and esters of alpha-sulfo-fatty acids (estersulfonates), e.g. alpha-sulfonated methyl esters of hydrated coco, palm or tallow fatty acids.

Surfactants are contained in laundry detergents in amounts preferably of 5 to 50 wt %, particularly of 8 to 30 wt %.

A laundry detergent or cleaning agent preferably contains at least one water-soluble and/or water-insoluble organic and/or inorganic builder. Water-soluble organic builder substances include polycarbonic acids, particularly citric acid and sugar acids, monomeric and polymeric aminopolycarbonic acids, particularly methylglycinediacetic acid, nitrilotriacetic acid and ethylenediaminetetraacetic acid and polyasparatic acid, polyphosphonic acids, particularly aminotris (methylenephosphonic acid), ethylenediaminetetrakis-(methylenephosphonic acid) and 1-hydroxyethane-1,1-diphosphonic acid, polymeric hydroxy compounds such as dextrin and polymeric (poly)carbonic acids, particularly carboxylates accessible via oxidation of polysaccharides or dextrines, polymeric acrylic acids, methacrylic acids, maleic acids and mixed polymers thereof, which may also contain small amounts of polymerizable substances without carbonic acid functionality, incorporated by polymerization. The organic builder substances may be used, particularly for preparing liquid agents, in the form of aqueous solutions, preferably in the form of 30 to 50 wt % aqueous solutions. All acids mentioned are generally used in the form of their water-soluble salts, particularly their alkali salts.

Such organic builder substances may desirably be contained in amounts of up to 40 wt %, particularly of up to 25 wt %, and preferably of 1 to 8 wt %. Amounts close to the upper limit mentioned are preferably used in pasty or liquid, particularly aqueous, agents.

Enzymes considered usable in the agents are those from the class of amylases, proteases, lipases, cutinases, pullulanases, hemicellulases, particularly mannanases, cellulases, oxidases, laccases, pektin-degrading enzymes, particularly pectate lyase and peroxidases and the mixtures thereof. Particularly suitable are enzymatic active ingredients obtained from fungi or bacteria such as *Bacillus subtilis, Bacillus licheniformis, Bacillus lentus, Streptomyces griseus, Humicola lanuginosa, Humicola insolens, Pseudomonas pseudoalcaligenes, Pseudomonas cepacia* or *Coprinus cinereus*. The enzymes may be adsorbed to carrier substances and/or embedded in wrapping substances to protect them against premature inactivation. They are contained in the laundry detergents or cleaning agents preferably in amounts of up to 5 wt %, particularly of 0.2 to 4 wt %. If several enzyme should be used in the laundry detergent or cleaning agent, this can be achieved by incorporating the two or more separate enzymes or enzymes separately formulated in a known manner or by two or more enzymes formulated together in one granulate or liquid formulation.

Organic solvents usable in the laundry detergents or cleaning agents, particularly when present in liquid or pasty form, in addition to water include alcohols having 1 to 4 C atoms, particularly methanol, ethanol, isopropanol and tert-butanol, diols having 2 to 4 C atoms, particularly ethylene glycol and propylene glycol, triols, particularly glycerol, and the mixtures thereof and the ethers derivable from the compound classes mentioned. Such water-miscible solvents are present in the laundry detergents or cleaning agents preferably in amounts of up to 30 wt %, particularly of 2 to 20 wt %.

In a further preferred embodiment of the invention, the laundry detergents or cleaning agents contain on usage of the specific porous polyamide particles according to the invention at least 3 wt % water-miscible organic solvent.

For adjusting a desired pH, which does not automatically result from mixing the remaining components, the agents may contain system-compatible and environmentally acceptable acids, particularly citric acid, acetic acid, tartaric acid, malic acid, lactic acid, glycolic acid, succinic acid, glutaric acid and/or adipic acid, but also mineral acids, particularly sulfuric acid, or bases, particularly ammonium or alkali hydroxides. Such pH regulators are contained in the laundry detergents or cleaning agents in amounts of preferably up to 20 wt %, particularly of 1.2 to 17 wt %.

The laundry detergents or cleaning agents may contain e.g. derivatives of diaminostilbenedisulfonic acid or its alkali metal salts as optical brighteners, although they are preferably free of optical brighteners for use as a color laundry detergent. Suitable are e.g. salts of 4,4'-bis(2-anilinio-4-morpholino-1,3,5-triazinyl-6-amino)stilbene-2,2'-disulfonic acid or similarly built compounds having a diethanolamino group, a methylamino group, an anilino group or a 2-methoxyethylamino group instead of the morpholino group. Further, brighteners of the type of substituted diphenylstyryls can be present, e.g. the alkali salts of 4,4'-bis(2-sulfostyryl)-diphenyl, 4,4'-bis(4-chloro-3-sulfostyryl)-diphenyl or 4-(4-chlorostyryl)-4'-(2-sulfostyryl)-diphenyl. Also mixtures of the aforementioned optical brighteners can be used.

In addition to the so far described laundry detergents or cleaning agents, the laundry detergent or cleaning agent composition may contain additional ingredients further improving the application-technical or esthetic characteristics of the laundry detergent or cleaning agent composition. Within the scope of the present invention, the laundry detergent or cleaning agent compositions additionally contain one or more substances of the group of bleaching agents, bleach activators, bleach catalysts, electrolytes, perfumes, perfume carriers, fluorescent agents, dyes, hydrotopes, foam inhibitors, silicone oils, soil-release polymers, graying inhibitors, anti-shrink agents, anti-crease agents, further dye transfer inhibitors, antimicrobial active ingredients, germicides, fungicides, antioxidants, preservatives, corrosion inhibitors, thickeners, antistatic agents, bitters, ironing aids, repellants and impregnating agents and UV absorbers and textile-softening compounds.

The use according to the invention of the specific porous polyamide particles takes place in a conventional laundry or cleaning process in a common household automatic washing machine, the usage of the porous polyamide particles within a laundry or cleaning process being limited to single use, thus the particles not being re-usable.

EXAMPLES

Example 1

Laundry Detergent Formulations

TABLE 1

Composition of a liquid laundry detergent A with the specific porous polyamide particles as compared to a commercial liquid laundry detergent B.

| | A | B |
|---|---|---|
| $C_{9-13}$-alkylbenzenesulfonate, Na salt | 8 | 8 |
| $C_{12-18}$ FAEO having 7 EO | 6 | 6 |
| $C_{12-14}$ FAEOs having 2 EO, Na salt | 10 | 10 |
| $C_{12-18}$ fatty acid, Na salt | 4 | 4 |
| sodium citrate | 3 | 3 |
| sodium borate | 1 | 1 |
| enzymes (cellulase, amylase, protease) | 1 | 1 |
| Perfume | 0.5 | 0.5 |
| Propanediol | 3 | 3 |
| Ethanol | 2 | 2 |
| PVA/maleic acid copolymer | 0.5 | 0.5 |
| optical brightener | 0.1 | 0.1 |
| phosphonic acid, Na salt | 0.5 | 0.5 |
| dyes and defoamer | 0.2 | 0.2 |
| porous polyamide particles | 2 or 5 | 0 |
| Water | to 100 | to 100 | all specifications in wt % in relation to the total agent; FAEO: fatty alcohol ethoxylate, FAEOS: fatty alcohol ethoxylatesulfate Example 2

Launderometer Experiment Liquid Laundry Detergents

TABLE 2

Specifications of the specific porous polyamide particles used. All polyamide particles are commercially available from Arkema.

| Trade name | Polymer | Volume-weighted median particle size [μm] | Specific surface [$m^2/g$] | Oil absorption rate [g/100 g] |
|---|---|---|---|---|
| Orgasol 1002 D Nat COS | polyamide-6 | 20 | 2.5 | 64 |
| Orgasol 2002 UD Nat COS | polyamide-12 | 5 | 9.5 | 104 |
| Orgasol Caresse | copolyamide-6/12 | 10 | 10 | 100 |

*as specified in DIN 66131

Laundry results from laundry experiments using liquid formulations containing polyamide particles according to the invention In the launderometer experiments, a launderometer from Atlas was loaded with 11 g accompanying laundry and standardized stains. Additionally, 0.82 g of the liquid laundry detergent A of example 1 was added to 200 ml water, and the whole mixture was washed at 30° C. After hang-drying the fabric cloths, their degree of whiteness was determined spectrophotometrically using a Minolta Chromameter CR-4000. In table 3, the differences of the remission values (in relation to the unitless y values of the remission measurement) compared to formulation B of example 1 are stated as mean values from three measurements. Positive values show an improved washing performance and a stronger washing out of the stain. When using the specific porous polyamide particles, good effects with an improvement of up to 8.8 units of greasy stains can be observed at 30° C.

TABLE 3

Difference of the remission values.

| Liquid laundry detergent with polyamide particles | Pigment sebum (wfk, 20D) | Pigment lanolin (wfk 20C) |
|---|---|---|
| 2 wt % Orgasol Caresse | 5.4 | 2.0 |
| 5 wt % Orgasol 1002 D Nat COS | 8.5 | 7.2 |
| 5 wt % Orgasol 2002 UD Nat COS | 8.6 | 8.1 |
| 5 wt % Orgasol Caresse | 8.8 | 7.2 |

Wfk 20D: pigment/sebum on 65/35 polyester/cotton, wfk 20C: pigment/lanolin on 65/35 polyester/cotton While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A laundry detergent comprising 0.5 to 10 wt % porous polyamide particles having
    a volume-weighted median particle size of 1 to 50 μm,
    an oil absorption capacity of at least 60 g/100 g, and
    a specific BET surface (as specified in DIN 66131) of 1 to 20 $m^2/g$;
wherein the laundry detergent further comprises: from 8 to 30 wt % surfactants selected from the group consisting of anionic surfactants, non-ionic surfactants, and mixtures thereof; from 1 to 8 wt % organic builder; from 0.2 to 4 wt % enzyme(s) selected from the classes of enzymes consisting of amylases, proteases, lipases, cutinases, pullulanases, hemicellulases, and mixtures thereof; and from 2 to 20 wt % organic solvent(s) selected from alcohols having from 1 to 4 C atoms, ethers derivable therefrom, and mixtures thereof.

2. The laundry detergent according to claim 1, wherein the polyamide particles contain polyamide-6, polyamide-12, copolyamide-6/12 or mixtures thereof.

3. The laundry detergent according to claim 1, wherein the polyamide particles have a volume-weighted median particle size of 2 to 40 μm.

4. The laundry detergent according to claim 1, wherein the polyamide particles have an oil absorption capacity of 80 g/100 g to 250 g/100 g.

5. The laundry detergent according to claim 1, wherein the polyamide particles have a specific BET surface (as specified in DIN 66131) of 1 to 15 $m^2/g$.

* * * * *